(12) United States Patent
Schmidt et al.

(10) Patent No.: US 11,838,578 B2
(45) Date of Patent: Dec. 5, 2023

(54) METHODS AND DEVICES FOR PERSONALIZING AUDIO CONTENT

(71) Applicant: Dolby International AB, Amsterdam (NL)

(72) Inventors: Malte Schmidt, Feucht (DE); Holger Hoerich, Fuerth (DE)

(73) Assignee: Dolby International AB, Dublin (IE)

( * ) Notice: Subject to any disclaimer, the term of this patent is extended or adjusted under 35 U.S.C. 154(b) by 7 days.

(21) Appl. No.: 17/778,295

(22) PCT Filed: Nov. 18, 2020

(86) PCT No.: PCT/EP2020/082493
§ 371 (c)(1),
(2) Date: May 19, 2022

(87) PCT Pub. No.: WO2021/099363
PCT Pub. Date: May 27, 2021

(65) Prior Publication Data
US 2022/0417585 A1 Dec. 29, 2022

Related U.S. Application Data

(60) Provisional application No. 63/043,179, filed on Jun. 24, 2020, provisional application No. 62/937,883, filed on Nov. 20, 2019.

(51) Int. Cl.
*H04N 21/439* (2011.01)
*H04N 21/462* (2011.01)
*H04N 21/81* (2011.01)
(52) U.S. Cl.
CPC ....... *H04N 21/439* (2013.01); *H04N 21/4622* (2013.01); *H04N 21/8106* (2013.01)

(58) Field of Classification Search
CPC ............ H04N 21/439; H04N 21/4622; H04N 21/8106; H04N 21/2335; H04N 21/26258;
(Continued)

(56) References Cited

U.S. PATENT DOCUMENTS

2010/0189266 A1  7/2010  Oh
2013/0216066 A1  8/2013  Yerrace
(Continued)

FOREIGN PATENT DOCUMENTS

WO        1999053612     10/1999
WO     WO 2017/136354  *  8/2017  ........... H04N 21/262

OTHER PUBLICATIONS

"Digital Audio Compression (AC-4) Standard; Part 2: Immersive and personalized audio", ETSI Technical Specification, European Telecommunications Standards Institute (ETSI), 650, Route Des Lucioles ; F-06921 Sophia-Antipolis ; France, vol. BROADCAS, No. VI.2.1 Feb. 6, 2018 (Feb. 6, 2018), pp. 1-250.
(Continued)

*Primary Examiner* — John R Schnurr

(57) ABSTRACT

The present document describes a method (400) for personalizing audio content. The method (400) comprises receiving (401) a manifest file (140) for the audio content. The manifest file (140) comprises at least one adaptation set (281, 282) referencing an audio bitstream (121), where the audio bitstream (121) comprises a plurality of audio objects (181), and a plurality of different preselection elements (291, 292, 293) for the adaptation set (281, 282), wherein the different preselection elements (291, 292, 293) specify different combinations of the plurality of audio objects (181). The method (400) further comprises selecting (402) a preselection element (291) from the plurality of different preselection elements (291, 292, 293), and causing (403) ren-
(Continued)

dering of an audio signal which depends on the selected preselection element (291).

9 Claims, 5 Drawing Sheets

(58) Field of Classification Search
CPC .......... H04N 21/4852; H04N 21/6373; H04N 21/8455; H04N 21/8456
See application file for complete search history.

(56) References Cited

U.S. PATENT DOCUMENTS

| | | |
|---|---|---|
| 2016/0029138 A1 | 1/2016 | France |
| 2017/0127212 A1 | 5/2017 | Jot |
| 2017/0156015 A1* | 6/2017 | Stockhammer .... H04N 21/8106 |
| 2018/0288500 A1* | 10/2018 | Stockhammer .. H04N 21/23614 |
| 2019/0037283 A1* | 1/2019 | Krauss ............... H04N 21/8586 |
| 2019/0115009 A1* | 4/2019 | Misra ..................... H04H 60/58 |
| 2019/0265944 A1 | 8/2019 | Küch |
| 2020/0321015 A1* | 10/2020 | Katsumata .............. G06F 13/00 |
| 2021/0021656 A1* | 1/2021 | Katsumata ............ H04L 65/613 |
| 2021/0021880 A1* | 1/2021 | Katsumata ......... H04N 21/4394 |
| 2022/0124419 A1* | 4/2022 | Kobayashi ......... H04N 21/8106 |

OTHER PUBLICATIONS

DVB Organization: "HbbTV v202 specification 2018 02 16.pdf", DVB, Digital Video Broadcasting, C/O Ebu-17A Ancienne Route—CH-1218 Grand Saconnex, Geneva—Switzerland, Feb. 18, 2018 (Feb. 18, 2018), XP017855524, p. 90, paragraph 9.1-p. 99, paragraph 9.4.

Peter Siebert DVB Project Office: "TM4995 MPEG-Dash Profile for Transport of ISO BMFF Based DVB Services including LL Dash.docx", DVB, Digital Video Broadcasting, C/O Ebu-17A Ancienne Route—CH-1218 Grand Saconnex, Geneva—Switzerland, No. 14, Oct. 8, 2019.

Riedmiller, J. et al. "Immersive & Personalized Audio: A Practical System for Enabling Interchange, Distribution & Delivery of Next Generation Audio Experiences" SMPTE 2014, pp. 1-28.

* cited by examiner

METHODS AND DEVICES FOR PERSONALIZING AUDIO CONTENT

CROSS-REFERENCE TO RELATED APPLICATION

This application claims priority of the following priority applications: U.S. provisional application 62/937,883, filed 20 Nov. 2019 and U.S. provisional application 63/043,179, filed 24 Jun. 2020, which are hereby incorporated by reference.

TECHNICAL FIELD

The present document relates to methods and devices for providing personalized audio signals to a user, notably a listener.

BACKGROUND

Modern television (TV) sets enable a user to load software applications onto a platform of the TV set. The platform may be viewed as a browser and the application may be a plugin extension of the browser. The software application may e.g. be provided by a content provider, and it may allow the user to select audio and/or video content from a server of the content provider.

A possible context for providing personalized audio and/or video content to a user is the HbbTV (Hybrid broadcast broadband TV) environment, with the specification ETSI TS 102 796. HbbTV makes use of the HTML5 (hypertext markup language) protocol, which comprises an application programming interface (API) for enabling content providers to provide software applications for new services (e.g. in the context of Video on Demand, VOD). The HTML5 API specifies a communication interface which allows an application, e.g. an application on a TV set, to communicate with the browser (also referred to herein as the terminal) of the TV set.

The present document addresses the technical problem of enabling scalable personalization of audio content of an audio/video experience, notably via the HTML5 API, in an efficient and reliable manner. The technical problem is solved by the independent claims. Preferred examples are described in the dependent claims.

SUMMARY

According to an aspect, a device and/or apparatus, notably an application unit or application, for personalizing audio content (notably audio content from an audio/video experience) is described. The device is configured to receive a manifest file for the audio content (notably for the audio/video experience). The manifest file comprises at least one adaptation set referencing an audio bitstream, wherein the audio bitstream comprises a plurality of different audio objects. Furthermore, the manifest file comprises a plurality of different preselection elements for the adaptation set, wherein the different preselection elements specify different combinations of the plurality of audio objects. The device is further configured to select a preselection element from the plurality of different preselection elements. In addition, the device is configured to cause rendering of an audio signal which depends on the selected preselection element. In particular, metadata comprised within the selected preselection element may be used for mixing the plurality of audio objects to form the audio signal, which is to be rendered.

According to a further aspect, a device and/or apparatus, notably an application unit or application, for personalizing audio content from an audio bitstream is described. The device is configured to receive an audio bitstream segment for the audio bitstream, wherein the audio bitstream segment comprises a pointer section with pointers pointing to different bitstream elements of the audio bitstream segment. The device is further configured to identify a gain pointer from the pointer section, which points to a first bitstream element for a gain and/or a position of an audio object of the audio bitstream. The first bitstream element may be any one of the bitstream elements within an element section of the audio bitstream segment. In addition, the device is configured to modify a value of the first bitstream element prior to rendering the audio object (thereby modifying the gain and/or the position of the audio object for rendering).

According to another aspect, a device and/or apparatus, notably an encoding device, for enabling personalization of audio content from an audio bitstream is described. The device is configured to receive an audio bitstream segment for or of the audio bitstream, wherein the audio bitstream segment comprises a pointer section with pointers pointing to different bitstream elements of an element section of the audio bitstream segment. The element section comprises a first bitstream element for a gain and/or a position of an audio object of the audio bitstream. The first bitstream element may be any one of the bitstream elements within the element section of the audio bitstream segment. In addition, the device is configured to set an integrity pointer within the pointer section to a pre-determined special value, wherein the pre-determined special value is such that it prevents a decoder from verifying integrity of the element section of the audio bitstream segment.

According to a further aspect, a device and/or apparatus for enabling personalization of audio content from an audio bitstream is described. The device is configured to receive an audio bitstream segment for or of the audio bitstream, wherein the audio bitstream segment comprises an element section with different bitstream elements. The element section comprises a first bitstream element for a gain and/or a position of an audio object of the audio bitstream segment. The first bitstream element may be any one of the bitstream elements within the element section of the audio bitstream segment. The device is further configured to insert a pointer to the first bitstream element into a pointer section of the audio bitstream segment (thereby enabling modification of the value of the first bitstream element for personalization).

According to an aspect, a method for personalizing audio content, e.g. audio content from or for an audio/video experience, is described. The method comprises receiving a manifest file for the audio content which is to be rendered. The manifest file comprises at least one adaptation set referencing an audio bitstream comprising a plurality of audio objects. Furthermore, the manifest file comprises a plurality of different preselection elements for the adaptation set, wherein the different preselection elements specify different combinations of the plurality of audio objects. In addition, the method comprises selecting a preselection element from the plurality of different preselection elements, and causing rendering of an audio signal which depends on the selected preselection element.

According to another aspect, a method for personalizing audio content from an audio bitstream is described. The method comprises receiving an audio bitstream segment for or of the audio bitstream, wherein the audio bitstream segment comprises a pointer section with pointers pointing to different bitstream elements of the audio bitstream segment. In addition, the method comprises identifying a gain pointer from the pointer section, which points to a first bitstream element for a gain and/or a position of an audio object of the audio bitstream. The method further comprises modifying a value of the first bitstream element prior to rendering the audio object.

According to another aspect, a method for enabling personalization of audio content from an audio bitstream is described. The method comprises receiving an audio bitstream segment for or of the audio bitstream, wherein the audio bitstream segment comprises a pointer section with pointers pointing to different bitstream elements of an element section of the audio bitstream segment, and wherein the element section comprises a first bitstream element for a gain and/or a position of an audio object of the audio bitstream segment. The method further comprises setting an integrity pointer within the pointer section to a pre-determined special value, wherein the pre-determined special value is such that it prevents a decoder from verifying integrity of the element section of the audio bitstream segment.

According to another aspect, a method for enabling personalization of audio content from an audio bitstream is described. The method comprises receiving an audio bitstream segment for or of the audio bitstream, wherein the audio bitstream segment comprises a pointer section with pointers pointing to different bitstream elements of an element section of the audio bitstream segment. The element section comprises a first bitstream element for a gain and/or a position of an audio object of the audio bitstream. The method further comprises inserting a pointer to the first bitstream element into the pointer section.

It should be noted that the methods described herein can each be implemented in software and/or computer readable code on one or more processors, in whole or in part of the respective methods.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

SHORT DESCRIPTION OF THE FIGURES

The invention is explained below in an exemplary manner with reference to the accompanying drawings, wherein FIG. 1a shows an example content distribution network;

DETAILED DESCRIPTION

Figure 1A:
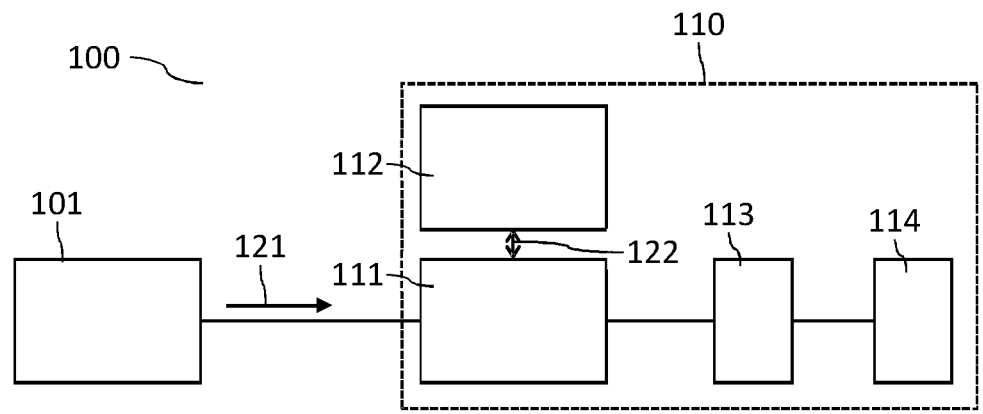
FIG. 1b shows example content of a (Dynamic Adaptive Streaming over HTTP, DASH) manifest, i.e. a Media Presentation Description, file.
FIG. 1c shows example presentations of audio components or audio objects within an audio bitstream.
FIG. 1d shows an example initialization segment of an audio bitstream or media element.
FIG. 1e shows an example adaptation set and an example preselection for enabling a personalized presentation of audio content.

As indicated above, the present document relates to providing scalable personalized audio content to a listener, notably using HTML5 and the HTML5 API. In this context FIG. 1a shows an example content distribution (notably broadcasting) network 100 with a network server 101 which is configured to provide audio and/or video content, notably an audio bitstream 121, to a content receiver 110. The network server 101 may be operated by a content provider.

The content receiver 110 comprises a terminal 111 which is configured to provide video and/or audio content to a decoder 113 and subsequently to a rendering unit 114 (e.g. a loudspeaker). Furthermore, the content receiver 110 comprises an application 112, which is typically provided by the content provider. The application 112 may be executed on a hardware platform (which may be integrated within a TV set). The terminal 111 and the application 112 may communicate with one another via an Application Programming Interface 122, e.g. the HTLM5 API.

The content receiver 110 may be implemented using a single computing entity (such as a TV set) or the content receiver 110 may be implemented within multiple computing entities (e.g. an entity for the terminal or browser 111 and a separate entity for the application 112).

The audio content may be provided from the server 101 to the receiver 110 using the Dynamic Adaptive Streaming over HTTP (DASH), notably the MPEG-DASH, protocol. The DASH protocol is an adaptive bitrate streaming scheme which enables streaming of media (notably video and/or audio) content over the internet from an HTTP web server 101. The DASH protocol is specified in ISO/IEC 23009-1: 2019 Information technology—Dynamic adaptive streaming over HTTP (DASH)—Part 1: Media presentation description and segment formats" (see https://www.iso.org/standard/79329.html), which is incorporated herein by reference.

The DASH protocol enables the transmission of an audio bitstream 121 (for a media element) from the server 101 to the receiver 110, wherein the audio bitstream 121 may comprise a plurality of different audio components or audio objects (e.g. for different languages, for narrative content, for background music content, for audio effects content, etc.). Furthermore, the DASH protocol enables the definition of different presentations which specify different combinations of one or more of the different audio components or audio objects. A presentation may specify

- the one or more audio objects from the plurality of different audio objects that are to rendered jointly; and/or
- how the one or more audio objects are to be mixed together for rendering.

Figure 1B:
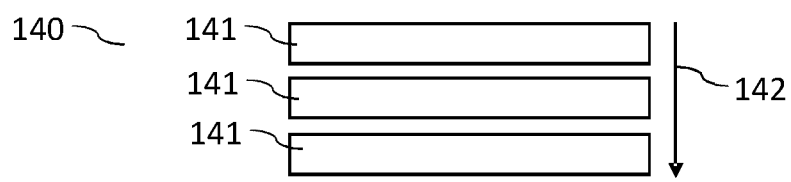
Figure 1C:
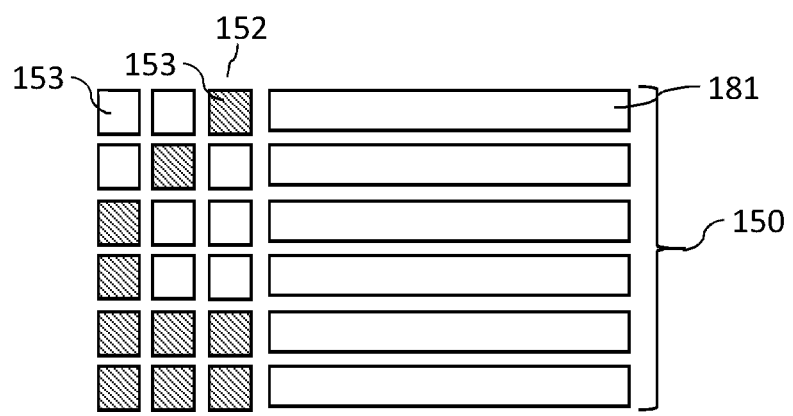
Figure 1D:
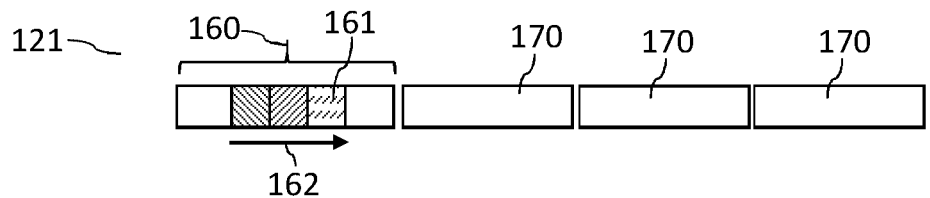
Figure 1E:
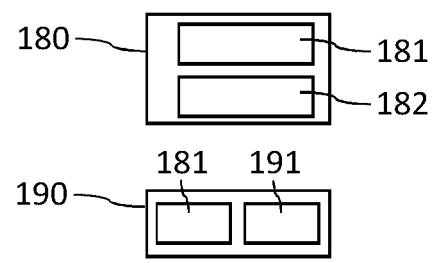

Possible means for defining a presentation or an audio experience are the so-called adaptation sets and/or the so-called preselection elements (as shown in FIG. 1e). The DASH protocol allows different audio objects (e.g. for different languages) to be assigned to different adaption sets 180. An adaptation set 180 may comprise one or more audio components or audio objects 181 (e.g. combined within an audio (bit-)stream). Different adaption sets 180 may e.g. be used to define different sets of audio objects 181, 182 for different groups of listeners (e.g. for different languages). In order to reduce the required bandwidth for an audio bitstream 121, the bitstream 121 may only comprise a subset of the overall number of adaptation sets 180 which are available for a particular video and/or audio content (or media element).

A further means for defining a presentation or an audio experience are preselection elements 190. A preselection specifies one or more audio objects 181, 182 (from an adaptation set 180) and a metadata set 191 which specifies how the one or more audio objects 181 are to be mixed together. In particular, a preselection may specify how the one or more audio objects 181, 182 of a single adaptation set 180 are to be mixed together. By providing different preselection elements 190 with different metadata sets 191, different presentations (e.g. with different emphasis on the narrative content or on the music and/or effects content) may be specified in a bit-rate efficient manner.

The DASH protocol specifies a so-called manifest file, which is an XML file that indicates and describes the different components which are comprised within an audio bitstream 121 or a media element. FIG. 1b shows an example manifest file 140 which indicates descriptions 141 for a number of different presentations, wherein the descriptions 141 for the different presentations may be listed within the manifest file 140 according to a particular manifest file order 142. The manifest file 140 may provide a description 141 for each of the different presentations which are available within the audio bitstream 121 or media element. The description 141 may be understandable by a user, and may therefore enable the user to select a particular presentation from the audio bitstream 121 for rendering. By way of example, the manifest file 140, notably the descriptions 141, may indicate which languages are available and/or which types of mixes of different audio objects 181, 182 are available.

FIG. 1c illustrates an example set 150 of audio objects 181 that is provided within an audio bitstream 121 or that is provided for a media element (e.g. within an adaptation set 180 of the audio bitstream 121). A presentation 152 may be specified in an efficient manner by providing indicators 153 that enable (dashed box) or disable (clear box) the different audio objects 181 individually.

FIG. 1d shows an example structure of an audio bitstream 121. The audio bitstream 121 may comprise an initialization segment 160 which specifies the different presentations 152 which are available within the audio bitstream 121. In particular, the initialization segment 160 may comprise a plurality of presentation sections 161 indicating the different presentations 152 which are available. The presentation sections 161 may be provided within the initialization segment 160 according to a particular segment order 162.

The initialization segment 160, notably the different presentation sections 161, may indicate so-called audio track objects, wherein each audio track object corresponds to a particular presentation 152. Based on the initialization segment 160 and/or based on the one or more adaptation sets and/or preselection elements in the manifest file 140, a list of audio track objects for a corresponding list of presentations 152 may be generated (by parsing the initialization segment 160). The list of audio track objects may be ordered according to the segment order 162 (which may differ from the manifest file order 142).

Furthermore, the audio bitstream 121 typically comprises media or bitstream, notably audio, segments 170 comprising one or more audio objects 181. The audio bitstream segments 170 (which may also be referred to as media segments) which are relevant for a particular presentation 152 may be indicated by the presentation section 161 for the presentation 152. An audio bitstream segment 170 may corresponds to a certain temporal excerpt of the audio content (e.g. to 20 ms of audio content).

As outlined above, the present document is directed at providing mechanisms for personalized interfaces for providing audio tracks (i.e. audio objects), notably in the context of a Hybrid Broadcast Television (HbbTV) environment.

The term "audio track" (or audio object 181) may refer to an interface representing a single audio track from one of the HTML media elements, <audio> or <video>. A possible use for accessing an AudioTrack 181 is to toggle its "enabled" property 153 in order to mute and unmute the track or object 181. Details are described in http://html.spec.whatwg.org/multipage/media.html#audiotrack or https://developer.mozilla.org/en-US/docs/Web/API/AudioTrack), which are incorporated herein. An "AudioTrack object" may be defined as a class defined by W3C to identify an entity that can be selected and/or played on its own.

A "file audio track" may be a track as defined in ISO/IEC 14496-12, section 3.1.19 (which is incorporated herein). The "file audio track" holds a sequence of access units comprising an elementary stream, as defined in section 8.3 of that document. An "initialization segment" 160 may be defined as a sequence of bytes that contain all of the initialization information required to decode a sequence of bitstream or media segments 170, as specified e.g. in https://www.w3.org/TR/2016/REC-media-source-20161117//#int-segment, which is incorporated herein.

The AudioTrack element or AudioTrack object may be used for personalization. Different personalized experiences may be variants derived from a common set 150 of audio objects 181, with some audio objects 181 being switched on or off. For example, where an English version of a documentary may be the music and effects track mixed with an English dialog, a German version may be derived by mixing the same music and effects track with a German dialog.

Traditionally, the mixing of different personalized experiences would likely have happened at a mixer's desk, located in a production studio. Due to advances in compression technology, next generation audio codecs are able to provide all the different audio objects 181 directly to the receiver 110 in one audio bitstream 121, which enables the user to choose and personalize the experiences to a greater extent and in a flexible manner.

Standards for receivers 110 have defined functionality for distributing and signaling such multi-component streams 121 to receivers 110. A receiver 110 may be implemented in a software environment resembling that of a standardized web browser. The present document is directed at the functionality of selecting one experience (also referred to herein as a presentation) 152 out of several different possible presentations 152, and/or at the possibility of defining a personal experience.

As an example, for playback using an HTML5 media element in an HbbTV browser, the W3C specification for HTML5 in tandem with the HbbTV specification TS 102 796 V1.4.1 or higher (which are incorporated herein by reference) specify an interface that enables discovery and selection of individual presentations 152.

The present document relates to enabling user control of narrative importance and improved accessibility, including outlining a scalable way forward from an experience that can be provided with functionality currently available in TV sets to a more advanced experience on future TV sets.

Figure 2A:
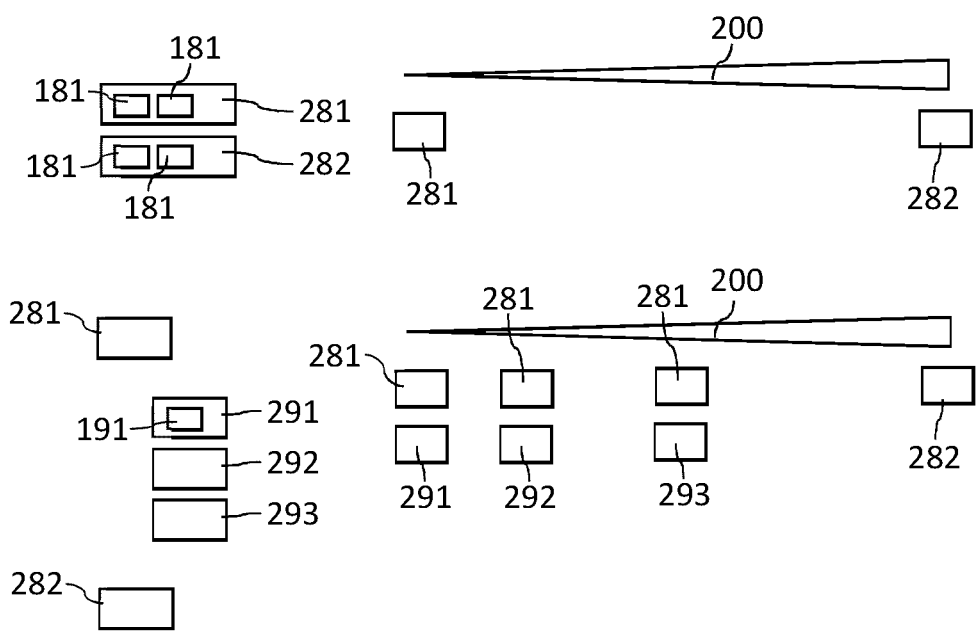
FIG. 2a illustrates the combined use of different adaptation sets and different preselection elements for enabling a scalable personalization of audio content.

In particular, the present document relates to combining adaptation sets 180 and preselection elements 190 in a single manifest file 140. In one example which is illustrated in FIG. 2a, an adaptation set 281 for a standard audio mix and a different adaptation set 282 for a narrative audio mix may be provided together with multiple different preselection elements 291, 292, 293 that provide different narrative mixes (and one preselection 291 of the standard audio mix).

An adaptation set 281, 282 may be defined as an individual audio (bit-)stream comprising one or more audio objects 181, 182. The different audio streams from the different adaptation sets 281m 282 comprise or provide different audio experiences. For example, an adaptation set 281, 282 may comprise an audio (bit-)stream with a plurality of audio objects 181 for a plurality of different languages or individual objects 181 that comprise a "standard" mix and a mix that comprises the essential elements of the narration only. Each adaptation set 281, 282 may comprise the language and/or mix in the same form multiple times. The individual audio objects 181 within an adaptation set 281, 282 may use different codec settings e.g. bitrates, to enable adaptive streaming. For example, an adaption set 281, 282 for Spanish may e.g. comprise two audio objects 181 with 768 and 48 kbit/s, respectively, and the client 110 may decode the 768 kbit/s audio object 181, when connected to Wi-fi, and the 48 kbit/s audio object 181, when connected to a mobile network.

In current television sets, application level selection of Audio Tracks may be supported as a baseline to present an experience 152 from a selection of different experience options 152. The list of available Audio Tracks is generated by the client 110, notably by the application 112, from information 141 comprised within the manifest file 140. The list of Audio Tracks (or AudioTrack objects) may be generated from the manifest information 141 based on adaptation sets 281, 282 and/or based on preselection elements 291, 292, 293.

When an application 112 requests to playback media, i.e. a media element, notably an audio bitstream 121 of a media element, from a network server 101, the application 112 passes the URL for the manifest file 140 of the media element (notably of the audio bitstream 121) to the network server 101 for media playback. The manifest file 140 may be downloaded from the location specified by the URL and the information 141 comprised within the manifest file 140 may be parsed. The terminal 111 may be configured to create AudioTracks (i.e. audio signals) from adaptation sets 281, 282 comprised in the manifest file 140 or from adaption sets 281, 282 and preselection elements 291, 292, 293. The terminal 111 may provide the created AudioTracks to the application 112 using the interface 122 for selection.

If only the adaptation sets 281, 282 are used, switching between different predefined experiences 152 from different adaptation sets 281, 282 may be provided. As illustrated in FIG. 2a, the different experiences which may be provided from different adaptation sets 281, 282 alone may differ quite significantly from one another (as indicated by the triangle 200 in FIG. 2a). The provision of different adaptation sets 281, 282 for different audio experiences 152 typically requires providing dedicated audio (bit-)streams for each adaptation set 281, 282. As separate audio streams are used within the different adaptation sets 281, 282 switching between the different adaptation sets 281, 282 may trigger re-buffering and may not allow for a seamless experience (when switching between different audio experiences 152).

Creating different Audio Tracks (i.e. audio signals) from preselection elements 291, 292, 293 is specified in HbbTV 2.0.2 Section A2.12.1, which is incorporated herein by reference. In view of the fact that different preselection elements 291, 292, 293 may reference a single adaptation set 281, separate audio streams are no longer needed for providing different experiences 152. Furthermore, as the same audio stream is used for different experiences 152, re-buffering is no longer required, such that experience selection may be provided in a seamless manner.

A manifest file 140 may be provided that comprises a combination of one or more adaptation sets 281, 282 and of one or more preselection elements 291, 292, 293. A basic on/off experience may be provided using the different adaptation sets 281, 282 and a gradual transfer from a first experience using a first adaptation set 281 and a second experience using a second adaptation set 282 may be provided using one or more preselection elements 291, 292, 293 (as illustrated in the lower part of FIG. 2a). In particular, a fine granular narrative importance control may be provided using preselection elements 291, 292, 293.

Providing a manifest file 140 which makes use of a combination of adaptation sets 281, 282 and preselection elements 291, 292, 293 may enable an on/off experience for selecting narrative focus on incumbent TV sets using adaptation sets 281, 282, and an advanced selection in steps on a next generation TV using preselection elements 291, 292, 293.

As indicated above, selection of a different adaptations set 281, 282 triggers switching to a different audio stream (with a plurality of audio objects 181) that is subsequently forwarded to the decoder 113 for decoding. When a different preselection element 291, 292, 293 for a given adaptation set 281, 282 is selected, the decoder 112 may be re-configured to decode the selected preselection element 291, 292, 293 (using the same audio objects 181). Alternatively, or in addition, a switch of audio objects 181 or audio streams may be triggered, when switching to a different preselection element 291, 292, 293.

Figure 2B:
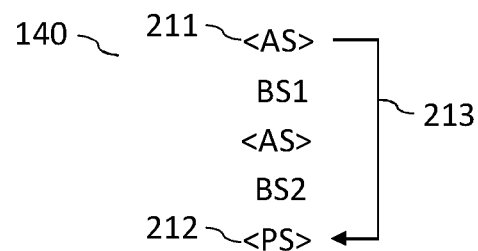
FIG. 2b shows example content of a manifest file.

FIG. 2b illustrates an example manifest file 140 comprising data elements 211 for different adaptation sets 281, 282 and data elements 212 for different preselections, The data elements 211 for an adaptation set 281, 282 may comprise pointers 213 to the one or more data elements 212 for the corresponding one or more preselections for the corresponding adaptation set 281, 282.

A user may be enabled to change the audio gain for different categories of one or more audio objects 181, including Dialog, Important Music & Effects (e.g. gunshot/door slam), Less important Music & Effects 1 (e.g. background music, traffic), Less important Music & Effects 2, etc.

Figure 3A:
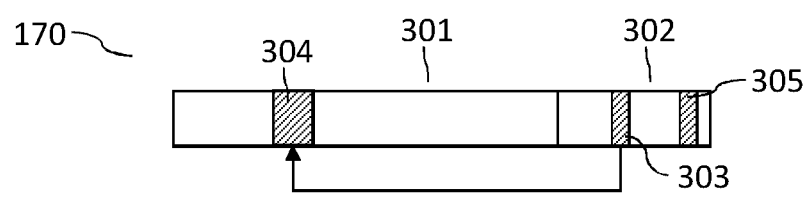
FIG. 3a shows example sections of an audio bitstream segment or frame.
Figure 3B:
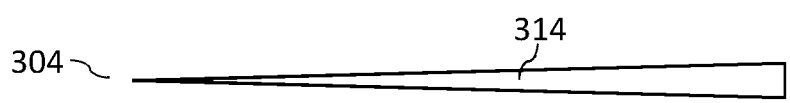
FIG. 3b illustrates possible values of a bitstream element.

In order to enable the control of the gain of the different categories of audio objects 181, the application 112 may be configured to modify the gain of one or more audio objects 181 in the audio bitstream 121. In order to enable the modification of the gain, a pointer 303 to the bitstream element 304 for the gain of each audio object 181 may be inserted into the bitstream 121, notably into the different bitstream or media segments 170 (as illustrated in FIG. 3a). The application 112 may then use the pointer 303 to the bitstream element 304 for the gain of an audio object 181 to identify and modify the gain for this audio object 181. A corresponding encoder of the bitstream 121 may be configured to add the pointers 303 to the bitstream elements 304 within a frame or audio bitstream segment 170. The application 112 may read the pointer information inserted by the encoder and may modify each frame or audio bitstream segment 170 prior to passing the frame or audio bitstream segment 170 to the decoder 113 (for rendering). By doing this, the user is enabled to precisely define a personalized experience.

For example, an application 112 may receive a user input on how much the dialog object 181 should be boosted or attenuated (this may be input e.g. using a user interface slider). The application 112 identifies the bitstream element 304 for the gain of the dialog object 181 using the pointer 303. Furthermore, the gain may be modified, and the modified frame or audio bitstream segment 170 may be passed to the decoder 113. The decoder 113 may decode the frame or audio bitstream segment 170 with the modified gain and may render the dialog object 181 using the modified gain.

Bitstream level modification on application level may make use of an access to the bitstream 121 by the application 112. This may be the case when the Media Source Extensions (MSE) API is used on the interface 122. The start points of AC-4 frames or audio bitstream segments 170 within a buffer may be identified by parsing the ISOBMFF (ISO/IEC base media file format) file structure in the buffer.

Data pointers 303 to individual bitstream elements 304 may be stored on a per frame basis and may be conveyed in the ISOBMFF sample subsequent to the actual AC-4 frame. As illustrated in FIG. 3a, the pointers 303 may be provided within a pointer section 302 which follows an element section 301 comprising the bitstream elements 304.

The following syntax may be used to define a pointer 303 to the bitstream element 304 for the gain and/or the position of an audio object 181:

```
for (i=1; i <= entry_count; i++) {
unsigned int(8) key;
unsigned int(16) frame_offset;
unsigned int(8) bitfield_length;
}
unsigned int(8) entry_count;
unsigned int(32) keyfield_id;
```

The above-mentioned syntax may be used to provide an optional unique identifier "keyfield_id" that may be used by the application 112 to determine whether pointers 303 to the bitstream elements 304 are present or not.

If the field "keyfield_id" is not present, the presence of the pointer data may be indicated by the manifest file 140 of the bitstream 121.

In the above-mentioned syntax, the field "entry_count" may be used to compute information on how much data has been added to the ISOBMFF sample. The field "entry_count" may be read prior to identifying the start point in the buffer for the added pointer data (i.e. the position of the first "key" or pointer 303).

Keys or pointers 303 may be assigned to specific AC-4 bitstream elements 304 and may be used to identify to which AC-4 bitstream element 304 the frame position information which is comprised within the key or pointer 303 applies to. The location of the bitstream element 304 denoted by the "key" value may be given by the "frame_offset" and "bitfield_length" parameters which describe the exact position of a specific data element in the frame.

Key or pointer assignment is preferably known to the application 112 and there may be some special keys or pointers that may be considered. Example keys are Key: 0x00—EMDF hash. Each frame is hashed and the hash value may need to be re-computed when a bit element of the frame changes; and/or key_id: 0x01—EMDF key ID. This pointer 305 points to the EMDF key ID. Changing this key value to the special key_id value 0x06 will cause the EMDF hash to be ignored and the EMDF hash does not need to be recalculated by the application 112. Hence, changing the value of this key 305 may be used as an alternative to re-computing the hash value over the frame. It should be noted that key_id 0x06 could also be changed in the encoder 101.

Keys for the individual mixing data may need to be known by the application 112, e.g.

Key: 0x10—Dialog mix level—object_gain_value of dialog;

Key: 0x11—Ambience 1 mix level—object_gain_value of ambience 1 mix;

Key: 0x12—Ambience 2 mix level—object_gain_value of ambience 2 mix;

Key: 0x13—Ambience 3 mix level—object_gain_value of ambience 3 mix;

Key: 0x14—Object position 1;

etc.

Editing a key or pointer enables the application 112 to modify mixing gains and/or object positions by applying mappings from user interface (UI) control elements to the values of mixing gains and/or object positions.

The way that the object_gain_value of the bitstream element 304 is typically coded may create an issue that may be solved as outlined in the following. Gain values of 0 dB, -inf and "repeat the other objects gain" are typically coded in a special manner and do not take up the same space in the bitstream 121 as a general object gain. This means that these special values cannot be replaced by general object gains and as general object gains can e.g. not take the value of 0, general gains cannot take on arbitrary numbers. If modification to or from such special values would be required an isolated replacement of data elements would not be possible and re-writing the bitstream 121 would be required.

It is therefore suggested to encode all objects with a positive or negative gain. The gain may then be chosen such that for any position of the user interface slider, i.e. for any gain value, a resulting value of 0 dB is prevented.

As an example: If the dialog is boosted by a maximum of 3 dB an encode of that dialog with −4 dB will always ensure a non-zero value resulting in a constant number of bits, which is spend on that field. The signal may be altered in level, which will be compensated by setting the dialnorm correctly to the new loudness (i.e. making it effectively −27 dB for the dialog example stated above, if the content was typical (EBU R-128) content).

In another example, a specific ruleset (function) may be added that generates the values 314 of specific bitstream elements 304 from an input value. This enables the use of arbitrary curves and mappings between UI inputs.

Example definitions include:
OAMD—Object Audio Metadata (e.g. audio object position and gains); and/or
MDAT—Container inside an ISO Base Media file (MP4 file), where the media data (e.g. the audio frames) are stored. Those frames are extracted based on offset and length information stored in the MOOV container of the ISO base media file.

Positioning an AD object can be implemented with the same means of the basic and advanced scheme as outlined above. With the approaches described in the basic section, each possible location will, however, multiply the number of options making the advanced selection preferable as the number of options increases.

Hence, an application control method for audio processing is described. The method comprises receiving at least an adaptation set 281, 282. Furthermore, the method comprises receiving at least a preselection element 291, 292, 293. In addition, the method comprises generating a list of available audio tracks (i.e. audio signals) based on the adaptation set 281, 282 and the preselection element 291, 292, 293.

The application 112 may be configured to provide a basic on/off experience based on the one or more adaptation sets 281, 282 on rendering devices 110 that only support adaptation sets 281, 282. Furthermore, the application 112 may be configured to provide a fine granular narrative importance control based on the preselection elements 291, 292, 293 on rendering devices 110 that support preselection elements 291, 292, 293 (in addition to adaptations sets 281, 282).

The preselection elements 291, 292, 293 may be at least one of: Dialog, Important Music & Effects (e.g. gunshot/door slam), Less important Music & Effects 1 (e.g. background music, traffic), Less important Music & Effects 2, etc.

Furthermore, a method and apparatus for reading a bitstream 121 and for creating a list of bitstream element pointers 303 for each frame or audio bitstream segment 170 of the bitstream 121 is described. The method may comprise determining the position and the length of a bitstream element 304, if the bitstream element 304 is comprised within the bitstream 121. Furthermore, the method comprises creating a user defined key or pointer 303 for that bitstream element 304.

In addition, a method for processing a bitstream 121 is described. The method comprises receiving a bitstream 121. In addition, the method comprises reading one or more pointers 303 from the bitstream 121. Furthermore, the method may comprise modifying the bitstream 121 (notably one or more bitstream elements 304 of the bitstream 121) based on the one or more pointers 303, and decoding the modified bitstream. The bitstream elements 304 may be object gains and/or object positions. Alternatively, or in addition, the bitstream elements 304 may be hashes that are recalculated to maintain the integrity of the frame or content segment 170 of the bitstream 121. Alternatively, or in addition, the bitstream elements 304 may comprise information related to hashes that are modified so that integrity of the frame is ignored by the decoder 113.

Figure 4A:
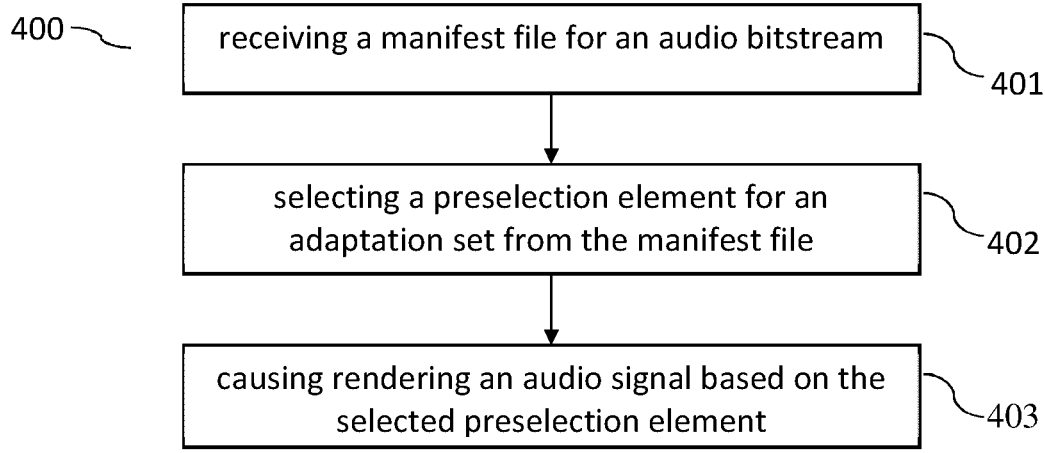
FIG. 4a shows a flow chart of an example method for providing personalized audio content (executed e.g. by a software application)

FIG. 4a shows a flow chart of an example method 400 for personalizing audio content. The audio content may be part of an audio/video experience. In particular, the audio content may be part of an HTML5 media element. The method 400 may be executed by an application 112 within an Hybrid broadcast broadband TV (HbbTV) system 100.

The method 400 may comprise receiving 401 a manifest file 140 for the audio content. The manifest file 140 may be a Dynamic Adaptive Streaming over HTTP (DASH) manifest file. The audio content may be comprised within an audio bitstream 121. The audio bitstream 121 may comprise or may be an AC-4 audio bitstream (as specified in ETSI TS 103 190, which is incorporated herein by reference).

The manifest file 140 may comprise at least one adaptation set 281, 282 referencing an audio bitstream 121 which comprises a plurality of audio objects 181. In addition, the manifest file 140 may comprise a plurality of different preselection elements 291, 292, 293 for the adaptation set 281, 282. The different preselection elements 291, 292, 293 may specify different combinations of the plurality of audio objects 181. In particular, the different preselection elements 291, 292, 293 may specify different schemes for mixing the plurality of audio objects 181 to form an audio signal which is to be rendered. For this purpose, the different preselection elements 291, 292, 293 may comprise different metadata sets 191.

The plurality of audio objects 181 may comprise an audio object 181 for dialog and/or narrative content, an audio object 181 for music content, and/or an audio object 181 for audio effects content. The different audio objects 181 may be mixed in dependence of the selected preselection element 291, 292, 293, to provide a personalized audio experience to a user.

The method 400 further comprises selecting 402 a preselection element 291 from the plurality of different preselection elements 291, 292, 293. The selection may be performed in dependence of a user input. The manifest file 140 may comprise a description 141 of the different audio (and possibly video) experiences which are associated with each one of the plurality of different preselection elements 291, 292, 293. The description 141 may be such that it enables a user to select an appropriate preselection element 291, 292, 293 for rendering.

In addition, the method 400 may comprise determining an audio signal for rendering, based on the plurality of audio objects 181 and based on the selected preselection element 291. The method 400 may further comprise retrieving at least one audio bitstream segment (or frame) 170 for the determined audio signal, and/or providing at least one audio bitstream segment 170 for the determined audio signal for rendering to a decoder 113. In particular, the method 400 may comprise causing 403 rendering of an audio signal which depends on the selected preselection element 291 (and typically on one or more of the plurality of audio objects 181).

By providing different preselection elements 291, 292, 293 for an adaptation set 281, 282, a finely granulated personalization of audio content may be provided in an efficient manner.

The manifest file 140 may comprise a first adaptation set 281 referencing a first audio bitstream 121 comprising a first set of audio objects 181 and a second adaptation set 292 referencing a second audio bitstream 121 comprising a second set of audio objects 181. The first adaptation set 281 may provide a first audio experience and the second adaptation set 282 may provide a second audio experience. Furthermore, the plurality of different preselection elements 291, 292, 293 may provide one or more intermediate audio experiences between the first audio experience and the second audio experience. In particular, the first audio experience may exhibit a lower emphasis on dialog and/or narrative content than the second audio experience. The one or more intermediate audio experiences may exhibit an emphasis on the dialog and/or narrative content, which lies between the emphasis of the first audio experience and the emphasis of the second audio experience. By providing different adaptation sets for coarsely granulated personalization and different preselection elements for finely granulated personalization, personalization of audio content may be provided in a particularly efficient and flexible manner.

The first set of audio objects 181 and the second set of audio objects 181 may comprise a common set of audio objects 181. On the other hand, the first adaptation set 281 and the second adaptation set 292 may differ in how audio objects 181 from the common set of audio objects 181 are to be combined to form the audio signal for rendering. By doing this, different audio experiences may be provided in an efficient manner.

Figure 4B:
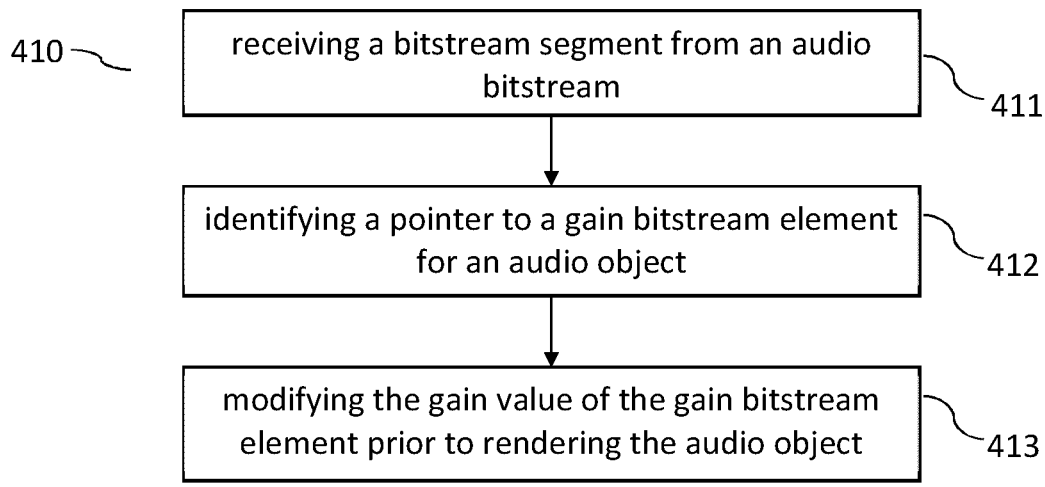
FIG. 4b shows a flow chart of an example method for providing personalized content (executed e.g. by a software application)

FIG. 4b shows a flow chart of another example method 410 for personalizing audio content from an audio bitstream 121 (of a media element). The audio bitstream 121 may be part of an audio/video experience. The method 410 may be executed by an application 112 within a HbbTV system 100.

The method 410 may comprise receiving 411 an audio bitstream segment 170 for the audio bitstream 121. The audio bitstream segment 170 may comprise a pointer section 302 with pointers 303 pointing to different bitstream elements 304 of the audio bitstream segment 170. The different bitstream elements 304 may be located in an element section 301 of the audio bitstream segment 170. The pointer section 302 may be located within the audio bitstream 121 downstream of the element section 301.

The method 410 further comprises identifying 412 a gain pointer 303 from the pointer section 302, which points to a first bitstream element 304 for a gain and/or a position of an audio object 181 of the audio bitstream 121. The first bitstream element 304 may be any one of the bitstream elements 304 within an element section 301 of the audio bitstream segment 170. The first bitstream element 304 may indicate a gain value (for amplifying and/or attenuating) and/or a position value (for positioning in space), which may be used for mixing the audio object 181 into an audio signal, notably for attenuating or amplifying and/or for positioning the audio object 181 in a personalized manner.

In addition, the method 410 may comprise modifying 413 the value of the first bitstream element 304 prior to rendering the audio object 181. The audio object 181 may then be rendered using the modified value of the first bitstream element 304. By modifying the value, the emphasis and/or the location of the audio object 181 may be modified in a personalized manner with a high degree of precision.

The method 410 may comprise determining a user input at a user interface (e.g. a slider), wherein the user input is indicative of a user value for the first bitstream element 304, which has been set by a user. The method 410 may further comprise setting the value of the first bitstream element 304 to the user value. By enabling the user to directly set the value of the first bitstream element 304, personalization of audio content may be achieved in a comfortable and precise manner.

The method 410 may comprise determining a modified hash value for the element section 301 of the audio bitstream segment 170, which comprises the first bitstream element 304 with the modified value. Furthermore, the method 410 may comprise replacing a hash value for the element section 301, which is directed at indicating integrity of the element section 301, notably the hash value of a hash bitstream element of the element section 301, by the modified hash value. By modifying the hash value, it may be ensured in an efficient and reliable manner that the audio bitstream segment 170 is decoded by a decoder 113 for rendering.

The method 410 may comprise verifying whether an integrity pointer 305 within the pointer section 302 points to the hash bitstream element or exhibits a pre-determined special value. The pre-determined special value may be such that it prevents the decoder 113 from verifying integrity of the element section 301 of the audio bitstream segment 170 (prior to decoding the audio bitstream segment 170).

The method 410 may comprise replacing the hash value of the hash bitstream element by the modified hash value, which depends on the modified value of the first bitstream element 304, if it is determined that the integrity pointer 305 points to the hash bitstream element. Alternatively, or in addition, the method 410 may comprise leaving the hash value of the hash bitstream element unchanged, if it is determined that the integrity pointer 305 exhibits the predetermined special value. By doing this, it may be ensured in an efficient and reliable manner that the audio bitstream segment 170 is decoded by a decoder 113 for rendering.

The method 410 may comprise ignoring the hash bitstream element when decoding and/or rendering the audio bitstream segment 170, if it is determined that the integrity pointer 305 exhibits the pre-determined special value. By doing this, it may be ensured in an efficient and reliable manner that the audio bitstream segment 170 is decoded by a decoder 113 for rendering.

The method 410 may comprise, prior to identifying the gain pointer 303, determining, notably based on the pointer section 302 and/or based on the manifest file 140 of the audio bitstream 121, whether a pointer 303 to the first bitstream element 304 is present or not. The identification of the first bitstream element 304 and the modification of the value of the first bitstream element 304 may only be performed, if it is determined that the pointer 303 is present. By doing this, the efficiency of personalization may be increased.

The modification of the value of the first bitstream element 304 is preferably performed such that the first bitstream element 304 is replaced by a valid gain value and/or position value.

The gain pointer 303 may be identified from the pointer section 302 of a dataset corresponding to an active preselection element 291, 292, 293 of the audio bitstream 121.

Figure 4C:
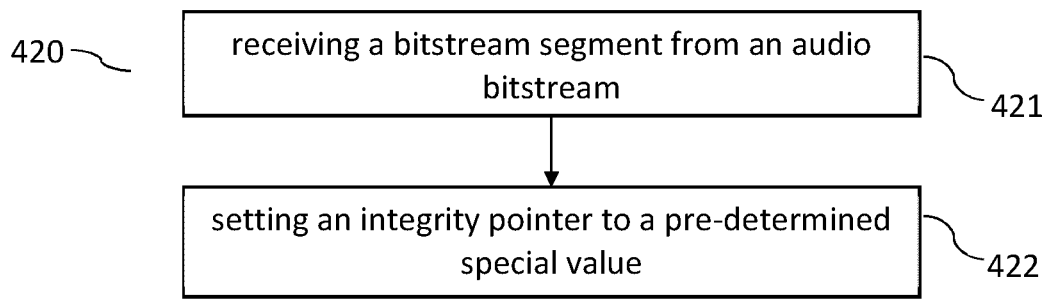
FIG. 4c shows a flow chart of an example method for enabling personalization of audio content (executed e.g. by a network server)

FIG. 4c shows a flow chart of a method 420 for enabling personalization of audio content from an audio bitstream 121. The audio bitstream 121 may be part of an audio/video experience and/or of a media element. The method 420 may be executed by an encoder or a transcoder (e.g. within a network server 101).

The method 420 may comprise receiving 421 an audio bitstream segment 170 for the audio bitstream 121, wherein the audio bitstream segment 170 comprises a pointer section 302 with pointers 303 pointing to different bitstream elements 304 of an element section 301 of the audio bitstream segment 170. The element section 301 comprises a first bitstream element 304 for a gain and/or a position of an audio object 181 of the bitstream element 170. The first bitstream element 304 may be any one of the bitstream elements 304 within the element section 301 of the audio bitstream segment 170.

In addition, the method 420 comprises setting 422 an integrity pointer 305 within the pointer section 302 to a pre-determined special value, wherein the pre-determined special value is such that it prevents a decoder 113 from verifying integrity of the element section 301 of the audio bitstream segment 170. By doing this, personalization of audio content at an application 112 is enabled in a reliable and efficient manner.

Figure 4D:
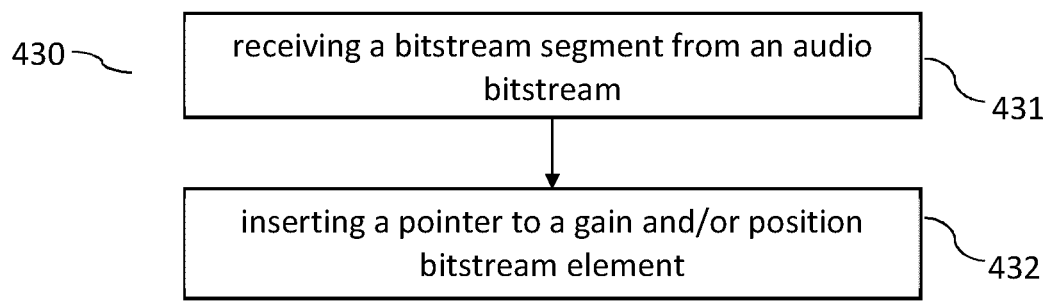
FIG. 4d shows a flow chart of an example method for enabling personalization of audio content (executed e.g. by a network server).

FIG. 4d shows a flow chart of an example method 430 for enabling personalization of audio content from an audio bitstream 121. The audio bitstream 121 may be part of an audio/video experience and/or of a media element. The method 430 may be executed by an encoder or a transcoder (e.g. within a network server 101).

The method 430 comprises receiving 431 an audio bitstream segment 170 for the audio bitstream 121. The audio bitstream segment 170 may comprise an element section 301 with different bitstream elements 304. In particular, the audio bitstream segment 170 may comprise a pointer section 302 with pointers 303 pointing to the different bitstream elements 304 of the element section 301 of the audio bitstream segment 170. The element section 301 may comprise a first bitstream element 304 for a gain and/or a position of an audio (bit-)stream 181 of the bitstream element 170. The first bitstream element 304 may be any one of the bitstream elements 304 within the element section 301 of the audio bitstream segment 170.

Furthermore, the method 430 comprises inserting 432 a pointer 303 to the first bitstream element 304 into the pointer section 302, thereby enabling an application 112 to identify the first bitstream element 304 and to modify the gain and/or position value for personalization of the audio content.

Furthermore, devices and/or apparatuses 112, 101 are described which are configured to execute the methods 400, 410, 420, 430, respectively.

Various modifications to the implementations described in this disclosure may be readily apparent to those having ordinary skill in the art. The general principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

The methods, devices, apparatuses and/or systems described in the present document may be implemented as software, firmware and/or hardware. Certain components may e.g. be implemented as software running on a digital signal processor or microprocessor. Other components may e.g. be implemented as hardware and or as application specific integrated circuits. The signals encountered in the described methods and systems may be stored on media such as random access memory or optical storage media. They may be transferred via networks, such as radio networks, satellite networks, wireless networks or wireline networks, e.g. the Internet. Typical devices making use of the methods and systems described in the present document are portable electronic devices or other consumer equipment which are used to store and/or render audio signals.

The invention claimed is:

1. A method for personalizing audio content, wherein the method comprises:

receiving a manifest file for the audio content; wherein the manifest file comprises a first adaptation set referencing a first audio bitstream comprising a first set of audio objects and a second adaptation set referencing a second audio bitstream comprising a second set of audio objects, and a plurality of different preselection elements for the first adaptation set; wherein the different preselection elements specify different combinations of the first set of audio objects;

selecting a preselection element from the plurality of different preselection elements; and rendering of an audio signal based on the selected preselection element, wherein the first adaptation set provides a first audio experience and the second adaptation set provides a second audio experience, and wherein the plurality of different preselection elements provide one or more intermediate audio experiences between the first audio experience and the second audio experience.

2. The method of claim 1, wherein the first audio experience exhibits a lower emphasis on dialog and/or narrative content than the second audio experience, and wherein the one or more intermediate audio experiences exhibit an emphasis on the dialog and/or narrative content, which lies between the emphasis of the first audio experience and the emphasis of the second audio experience.

3. The method of claim 1, wherein the first set of audio objects and the second set of audio objects comprise a common set of audio objects, and wherein the first adaptation set and the second adaptation set differ in how audio objects from the common set of audio objects are to be combined to form the audio signal for rendering.

4. The method of claim 1, wherein the plurality of audio objects comprises at least one of: an audio object for dialog and/or narrative content, an audio object for music content, and an audio object for audio effects content.

5. The method of claim 1, wherein the manifest file comprises a description of an audio experience associated with each one of the plurality of preselection elements.

6. The method of claim 1, further comprising:

retrieving at least one audio bitstream segment for the audio signal; and providing at least one audio bitstream segment or the audio signal for rendering to a decoder.

7. The method of claim 1, wherein the manifest file is a Dynamic Adaptive Streaming over HTTP, referred to as DASH, manifest file.

8. The method of claim 1, wherein the method is executed by an application within an Hybrid broadcast broadband TV, referred to as HbbTV, system.

9. A system for personalizing audio content, wherein the system comprises:

a receiver for receiving a manifest file for the audio content, wherein the manifest file comprises a first adaptation set referencing a first audio bitstream comprising a first set of audio objects and a second adaptation set referencing a second audio bitstream comprising a second set of audio objects, wherein a plurality of different preselection elements for the first adaptation set, and wherein the different preselection elements specify different combinations of the first set of audio objects;

a selector for selecting a preselection element from the plurality of different preselection elements; and a renderer for rendering of an audio signal which depends on the selected preselection element, wherein the first adaptation set provides a first audio experience and the second adaptation set provides a second audio experience, and wherein the plurality of different preselection elements provide one or more intermediate audio experiences between the first audio experience and the second audio experience.

\* \* \* \* \*